United States Patent Office 3,166,843
Patented Jan. 26, 1965

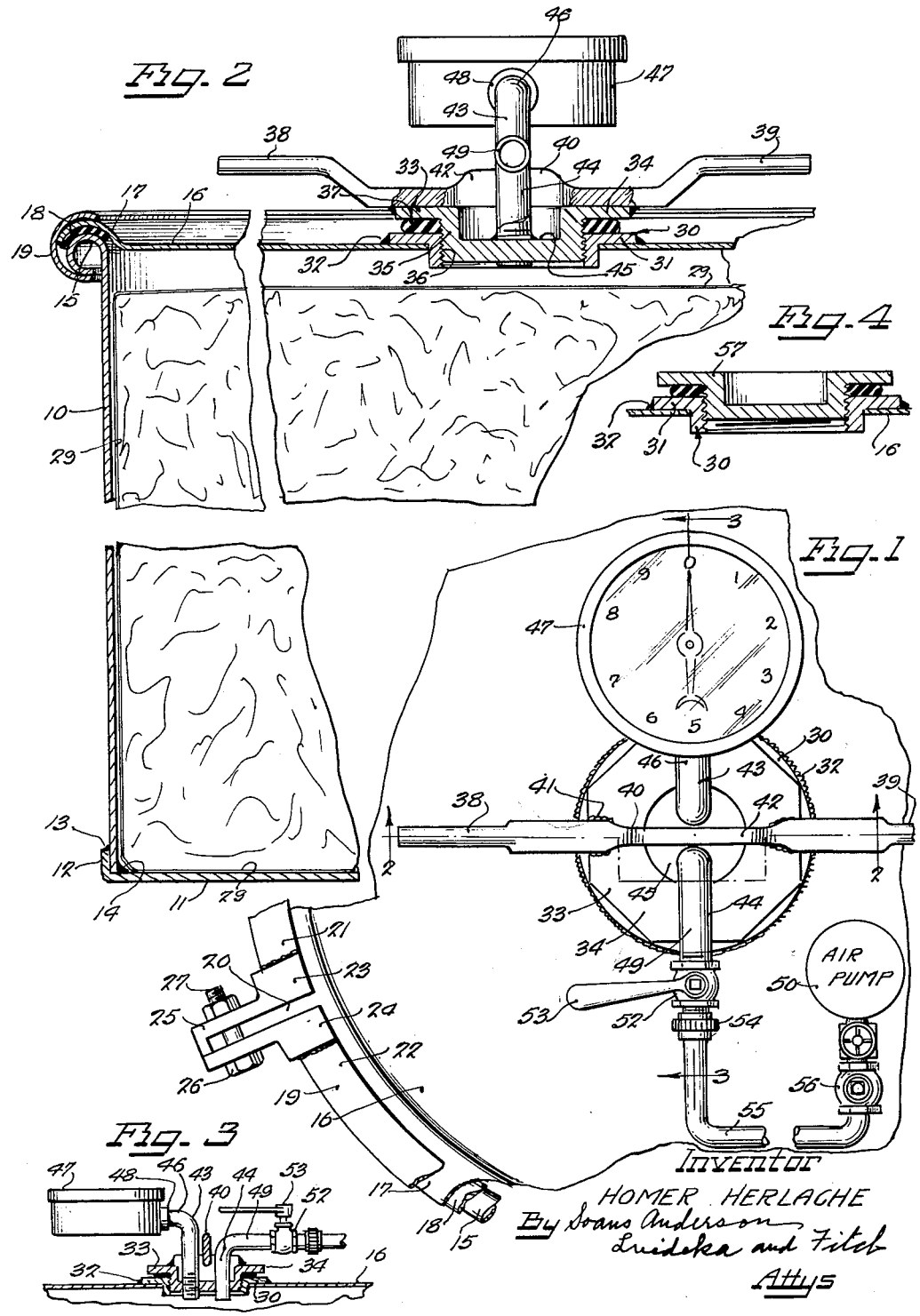

3,166,843
METHOD OF CURING CHEESE IN AN INSPECTION TYPE CONTAINER
Homer Herlache, Green Bay, Wis., assignor to National Dairy Products Corporation, Chicago, Ill., a corporation of Delaware
Filed May 24, 1962, Ser. No. 197,356
1 Claim. (Cl. 31—46)

The invention relates to a method and equipment for finding a leak in a barrel used for curing cheese and is particularly valuable in connection with the curing of cheese such as may be made by a cheddar process or by a variation thereof, for example, a stirred curd process.

In making cheese of the general character referred to, the curd, after removal from the cheese vat, is usually drained in a form permitting the whey to drain from the curd during a period of several hours, usually overnight, during which time the pieces of curd begin to knit together to form a consolidated mass within the form. Thereafter the formed and uncured cheese units are sealed by various methods and materials and are allowed to stand in an atmosphere of the required temperature, humidity, etc. for a substantial period of time, usually not less than 30 days and sometimes for a period of a year or more if a particularly "sharp" cheese is desired.

During recent years, some reduction in the expense of draining, knitting and curing of the curd has been obtained by the use of large curing drums which contain several times as large an amount of curd as has been customary in most of the processes commercially used. It has been found commercially advantageous to drain and knit the curds in a drum having a capacity of up to 50 or 60 U.S. gallons containing between 450 and 500 pounds of curd before draining. A typical drum for this purpose may contain 55 gallons holding 475 pounds of undrained curd, and may have a depth of about 28 inches more or less. The drum is usually made of steel. The lower end of the drum is closed permanently and the upper end of the drum is made with a removable lid so that the curd can be conveniently charged into the drum. Preferably, before introducing the curd into the drum, it is lined with a suitable plastic material, such as polyethylene plastic sheeting, which prevents the curd from contacting the interior surface of the drum.

The drainage of the curd is effected by placing a temporary lid on the open end of the drum and then placing the drum in a position where the whey can drain out of the mass of the curd and out around the temporary lid. In a typical case, a load of undrained cheddar curd weighing about 475 pounds may lose about 50 pounds of whey during the first few hours of the draining period by which time most of the drainable whey has drained off.

Further describing this drum process, for purposes of illustration and not limitation, after the conclusion of the draining process, the drum of drained curd is positioned with the open end facing upwardly, and a lid is applied to said upper end of the drum. The periphery of the lid is sealed to the upper rim of the drum, with a suitable sealing ring of rubber or equivalent material interposed between the lid and the drum rim. These parts are normally clamped together by a conventional clamp-ring element generally of approximate U-shape, which may be tightened by means of a tangenial bolt and nut or the like, which generally serves to make a reasonably hermetic seal between the lid and the end of the drum.

However, in view of the fact that these drums, especially when filled with curd, are difficult to move around and awkward to handle, the drum parts are often damaged or distorted on reuse to an extent which causes a defect in the seal between the rim of the drum and the rim of the lid, or the sealing gasket may develop a defect. Sometimes even, a new drum may have a defect which cannot be detected by the usual visual inspection. For whatever reason, these defects in the sealing of the drum occur with some frequency, especially where the drums, which are rather expensive, cannot be discarded after a single use.

It will be understood that a process for curing cheese, of the type described, requires that the surface of the cheese in its uncured or partially cured state must be protected from the atmosphere in order to prevent the growth of mold. If mold is found to exist on the finished article when removed from the drum for sale it reduces the grade of the cheese or in an extreme case, may render it unfit for human consumption. This is a very serious matter when dealing with a unit or final product weighing 475 pounds more or less, especially where it is a matter of great difficulty to make a proper examination of the surface of the enclosed unit from time to time during the period of cure to determine whether all is well so far as the presence of mold is concerned.

The object of the present invention is to provide a method and equipment by which the condition of the seal may be determined at an early date in the process before significant leakage of air has occurred so that, before it is too late in the process, proper steps can be taken to repair the seal or to transfer the contents of the defective drum to a drum which has been especially examined to determine whether the seal arrangement is in first rate order.

In the following detailed description of one example of the method and equipment employed to achieve the general object described, there is disclosed one important feature which is first the creation of a substantial differential of pressure between the exterior and interior of the drum quite soon after the curd has been fully drained and then enclosed in the drum to which the lid has been applied. For example, before the loaded drum is put into the curing room, a supply of air may be pumped into the drum, and the pressure in the drum is noted or recorded. The pressure differential is again observed at the expiration of a given period of time by which time any unusual change has occurred in the pressure differential under the conditions existing.

Since only a relatively small percentage of the drums of cheese or curd are inadequately sealed, and since there are probably a fairly large number of drums of curd produced in a single batch, the fact that an occasional drum has lost much more of its pressure differential than other drums in the same batch, indicates clearly that the seal in that particular drum is defective. Thereupon, before it is too late, the defective drum is immediately removed from the batch of good drums and steps may be taken to correct the defect, either by removing or adjusting the seal, or in certain cases, the body of cheese can be transferred into another drum.

In the accompanying drawings which illustrate one type of equipment which has been successfully used in practicing the aforesaid method:

FIGURE 1 is a plan view of a fragmentary portion of the upper end of he drum showing the testing equipment in place prior to the development of a testing pressure differential;

FIGURE 2 is a vertical section taken on line 2—2 of FIGURE 1;

FIGURE 3 is a section taken on line 3—3 of FIGURE 1; and

FIGURE 4 is a section of a fragmentary portion of

FIGURE 2, but showing a permanent bung instead of a temporary bung.

In the drawings, the numeral 10 is the outer wall of the tubular container or drum which is in the form of an elongated cylinder, the lower end of which is closed. To this end the outer periphery of the bottom plate or disc 11 may be flanged upwardly as indicated at 12 and united hermetically to the outside of the lower end of the part 10 by means such as a continuous fillet weld, as indicated at 13. Also if desired, another weld 14 may be provided on the inside between parts 11 and 10.

The upper end of the tubular outer shell 10 of the container may be formed with a peripheral rolled flange 15 extending continuously around the upper edge of the drum. The open end of the drum is enclosed by a flat steel cover or lid 16 having an outer peripheral curved margin 17 formed to extend over and cooperate with the upper portion of the curved flange 15 of the drum. Between the flanges 15 and 17 there is interposed a continuous sealing ring or gasket 18 of suitable sealing material, such as rubber or other plastic substance. Said parts 15 and 17 are securely clamped together by means of a U-shaped clamping ring 19 which has a gap 20 at one point in its circumference, as shown in FIGURE 1. The ends 21 and 22 of the ring 19 on either side of the gap 20 are fitted with lugs 23 and 24 having outwardly extending ears 25 and 26 through which passes a tangential draw-bolt 27.

When applying the seal, bolt 27 is slacked off to allow the ends 21 and 22 of the ring to expand and thus permit the ring 19 to be removed so that the lid or cover 16 can be raised and removed. Similarly, when the parts have been replaced in order to close the drum, the bolt 27 may be tightened to bring the ends 21 and 22 in close proximity, as shown in FIGURE 1, thereby applying a substantial pressure to the sealing ring 19 which is interposed between the flanges 15 and 17 and the drum 10 and its cover 16.

The drained curd is protected from contact with the inside surface of the drum by means of a jacket of suitable plastic sheeting, such as polyethylene 29 which is preferably made in the form of a tube, the opposite ends of which may be folded over to protect the ends of the curd body.

Up to this point, as described, the equipment used resembles conventional arrangements used for practicing the processes for the drum curing of cheese in large units. However, it will be observed that in this particular equipment, as hereinafter described, in the upper lid 16, which covers the open end of the drum, there is an aperture in which is fitted an internally threaded bushing or nipple 30. The outer edge of the bushing 30 has an integral outwardly projecting flange which extends over the edge of the aperture in the lid 16, and is hermetically united to the cover or lid 16 by means of a continuous weld 32 extending around the outer periphery of the flange 31.

When the curd has been drained, and after the drum has been placed in the position shown in FIGURE 2, with the lid 16 applied thereto and sealed at the peripheral edge thereof, there is inserted into the interior of the flanged nipple 30 a temporary bung 33 indicated in FIGURES 2 and 3. This temporary bung is initially of the same shape and size as indicated in FIGURE 4. Returning to FIGURE 2, it will be observed that the depending bushing portion 35 of the temporary bung 33 is threaded on the exterior of said portion 35 as indicated at 36 to fit within the corresponding threads formed on the interior of the aperture in the fixed bushing 30. The upper face of said temporary bung 33 is formed with an angular flange 34 which overlaps the flange 31 of the bushing 30 and between said two flanges 34 and 31 if desired, there may be inserted a sealing ring 37 of rubber or other suitable material. However, if the threads 36 are tapered slightly to fit a corresponding taper of the other threads, such as in the case of a pipe thread, the sealing ring 37 need not be used.

In order to enable the temporary bung 33 to be conveniently and rapidly applied to the lid 16 without the use of special tools, the top of the bung 33 is equipped with a pair of oppositely disposed handles 38 and 39 which constitute integral diametrically disposed extensions of a bar 40 of circular cross-section which is welded to the flange 34 of the bung. (See also FIGURE 1, as indicated at 41.) If desired, the bar 40 may be flattened as indicated at 42, so as not to interfere with a pair of spaced riser tubes 43 and 4 which are welded into a pair of apertures in the floor or inner end 45 of the temporary bung 33.

The riser tube 43 is provided with a horizontal leg 46 which is connected to and supports a gauge 47. There may be a permanent direct connection between the pipe 43 and the gauge nipple 47, but if desired, the gauge 47 may be connected to said pipe 43 by a quick detachable union 48. Otherwise, a gauge may be permanently attached to each one of the temporary bungs 33 used in a single batch of drums.

The riser tube 44 is similarly provided with a horizontal leg 49 which connects the interior of the drum with an air pump indicated at 50, by means of which air may be pumped into the drum. Pumping into the drum to raise its pressure is generally desirable. A suitable pressure differential between the interior and exterior of the drum is about 5 pounds per square inch. If necessary, the horizontal pressure line 49 which connects the riser 44 with the air pump may be closed by a suitable valve 52 operated by a handle 53. A quick detachable union 54 may be used to connect a flexible extension pipe 55 extending between the stop valve 52 and the air pump 50. Also, if desired, a pressure control valve or device 56 of conventional construction may be interposed between the flexible duct 55 and the air pump 50 so that a prescribed uniform pressure will be delivered by the duct 55 to the interior of the drum regardless of whether the pump can deliver a higher pressure.

To summarize the procedure, after the curd has been drained and the lid 16 applied and clamped into sealing contact with the top of the drum, the temporary bung with its gauge, is screwed into the threaded opening in the lid and then the pump is connected to the bung by means of the union 54. The pressure from the pump 50 is then turned on, and in a very short time the pressure in the drum will rise to the desired point, for example, 5 pounds per square inch. Then the valve 53 is closed and the union 54 is disconnected so that the pump can be used to perform the same operation on another drum of curd and so on until an entire batch of drums has been treated so as to raise the pressure of the interior to 5 pounds above atmosphere. Then after a suitable interval, say from a few minutes to an hour, depending upon skill, and the sensitivity of the gauge, the gauge is read to determine whether there has been any significant change in the pressure differential, which is a departure from the usual schedule. If there is found to be no significant variation in the presure differential, the pressure may be relieved by opening the valve 52 and the temporary bung with its valve is unscrewed and replaced by a permanent bung 57 (see FIGURE 4), of conventional construction.

By this method of operation it is only necessary to provide enough specially equipped temporary bungs for a few drums of curd. At the conclusion of the testing, and removal of the special temporary bungs, each drum is equipped and sealed with a conventional bung which is much more desirable than if special bungs and gauges had to be used in the curing of the curd.

The curing is then carried on at the required temperature and for a sufficient length of time to produce the desired degree of sharpness. The small amount of air trapped in the sealed drum is quickly used up so that the curing is effected under substantially anaerobic conditions.

What is claimed is:

Method for determining the presence of and correcting a leak in a drum containing cheese curd which is to be cured under anaerobic conditions, which method includes draining and initially knitting the curd in a drum having one end closed and its other end unsealed, applying to the said unsealed end a lid to be used in sealing the drum during the remainder of the knitting process, providing the said lid with a temporary removable apertured bung and with a removable pressure gauge communicating with the interior of the drum, pumping gas through said bung to create a difference in fluid pressure between the interior and exterior of the drum, taking a gauge reading in the initial knitting period to determine whether there has been any unscheduled change in said pressure differential, if no leak be found, promptly replacing the temporary bung with a permanent bung and removing the gauge, whereby, after the completion of the knitting in the drum, and the removal of the lid, the consolidated mass of curd may be removed from the drum.

References Cited in the file of this patent

UNITED STATES PATENTS

| | | |
|---|---|---|
| 1,590,736 | Clark | June 29, 1926 |
| 2,847,851 | Enell | Aug. 19, 1958 |
| 2,912,852 | Trinneer | Nov. 17, 1959 |

FOREIGN PATENTS

| | | |
|---|---|---|
| 823,153 | Great Britain | Nov. 4, 1959 |